(No Model.)
J. H. ROBERTSON.
WRITING TELEGRAPH.
No. 543,429.  Patented July 23, 1895.
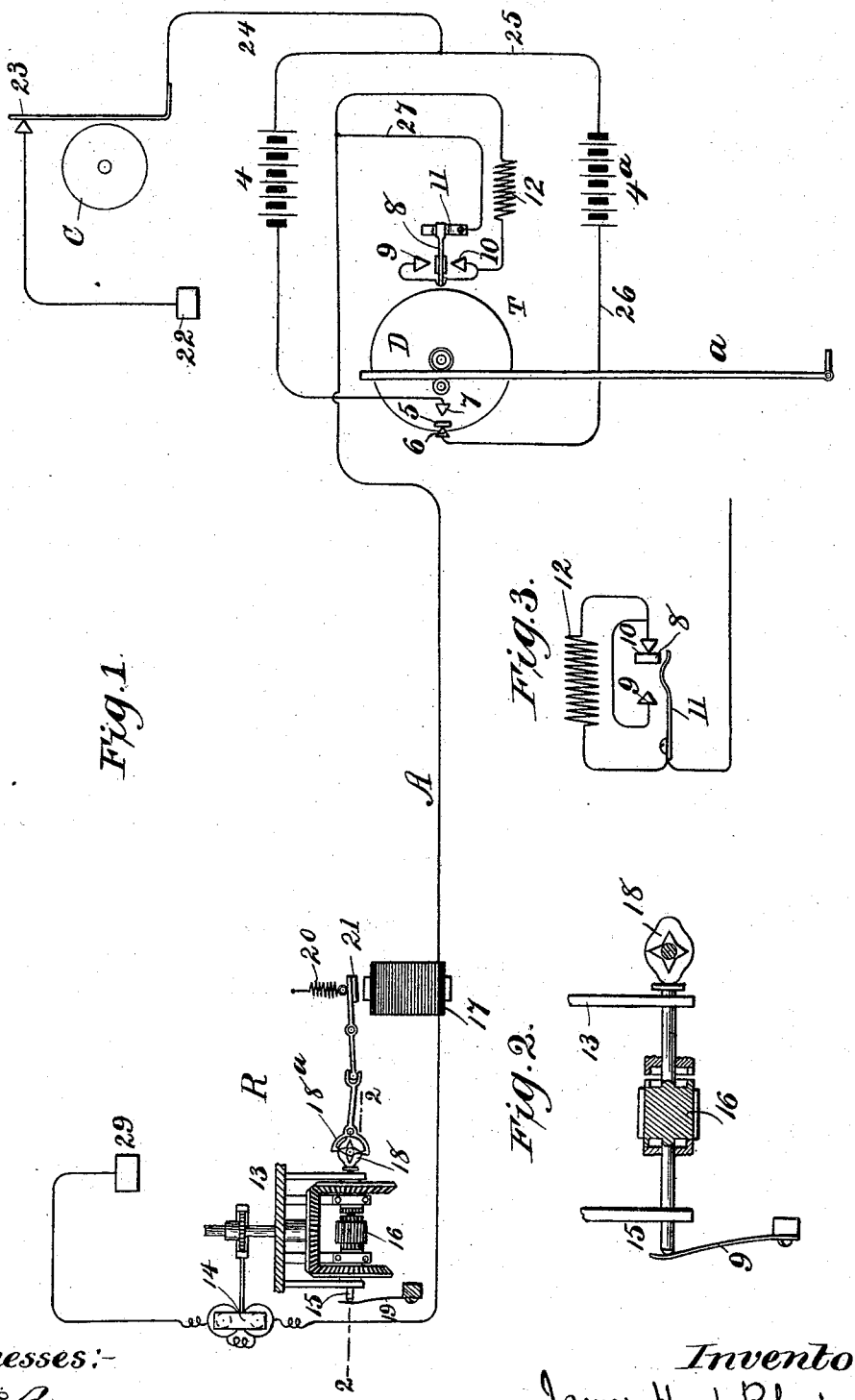
Witnesses:—
W. E. Bowen
W. C. Pinckney
Inventor:
James Hart Robertson

UNITED STATES PATENT OFFICE.

JAMES HART ROBERTSON, OF BROOKLYN, NEW YORK, ASSIGNOR TO WILLIAM E. GUMP, OF SAME PLACE.

WRITING-TELEGRAPH.

SPECIFICATION forming part of Letters Patent No. 543,429, dated July 23, 1895.

Application filed March 21, 1895. Serial No. 542,623. (No model.)

*To all whom it may concern:*

Be it known that I, JAMES HART ROBERTSON, a citizen of the United States, and a resident of Brooklyn, in the county of Kings and State of New York, have invented certain new and useful Improvements in the Transmission of Autographic Signs, of which the following is a specification.

This invention has reference to writing-telegraphs, such as is described in my application for patent, Serial No. 542,621, wherein are employed but two main-line wires and an automatic commutator at the transmitting end, which is adapted to transform the said main lines and the batteries into a single metallic circuit to transmit the impulses which give the perpendicular movements to the receiving-pen.

My present improvements have reference, however, to such instruments as utilize pulsations of successively-opposite polarity to cause the receiving-pen to respond to the movements of the transmitting-pen, such an instrument being shown in my application, Serial No. 542,622, and in which latter application there is employed for the purpose of reversing the movements of the feed-mechanism at the receiver—which mechanism gives the lateral movements of writing—a series of electromagnets and resistances arranged in the connections between the main lines and the transmitter. In the present instance I dispense with the aforesaid electromagnets at the receiver and make use of other mechanism for reversing the shaft of the feed mechanism, all the impulses of successively-opposite polarity being sent through a resistance-coil at the transmitting end, except at the instant of reversal, when the coil is cut out.

In the accompanying drawings, forming a part of this specification, and wherein like features are indicated in the several views by like letters and numerals of reference, Figure 1 is a diagrammatic view of apparatus embodying my present improvements. Fig. 2 is an enlarged sectional view on the line 2 2 of Fig. 1, parts of the mechanism through which the section is taken being omitted for the sake of clearness; and Fig. 3 is a detail view of the reversing-lever, its contacts, and the spring with which said lever coacts to cut in and out the resistance-coil, as shown in Fig. 1, for reversing lateral movements at the receiver.

Referring to the drawings, T indicates the transmitting apparatus, R the receiving apparatus, and A one of the main-line wires. The batteries at the transmitter are indicated by 4 4ª, and D is the circuit-interrupter. The arm *a* of the transmitting-pen is mechanically connected to the circuit-interrupter, as shown, so that as the said arm is moved forward and backward pulsations of successively-opposite polarity are produced in the main line A by the vibratory contact-maker 5 coming alternately in contact with the contact-points 6 7, the number of makes and breaks varying with the linear extent of movement of said arm *a*.

Secured to the shaft of the circuit-interrupter D is the reversing-lever 8, which makes contact with the contact-points 9 10, according as the arm *a* of the transmitting-pen is moved forward or backward. Arranged in appropriate relation to contact-points 9 10 and in a branch of the main line is the spring 11, having a raised or elevated portion with which the reversing-lever 8 comes in contact when passing from contact-point 9 to 10, or vice versa, as the arm of the transmitting-stylus is moved from or toward the operator. This spring 11 supplies what I herein call a friction-contact. In electrical connection with the two contact-points 9 10 and in a branch with the main line A is the resistance-coil 12, and, as already stated, all the impulses pass through this coil, except when the reversing-lever 8 makes contact with the spring 11, which it does in passing between contacts, and during this reversal the resistance is cut out of the main line.

The commutator, which is fully illustrated and described in my application, Serial No. 542,621, is indicated in the drawings of the present application at C.

At the receiving end the reversing mechanism is indicated by 13, and its escapement by 14. The construction of these parts will be preferably the same as shown in my application, Serial No. 542,621.

The shaft 15 carrying the reversing gear-wheel 16 is moved in the two directions to reverse the direction of travel of said gear-wheel through the medium of the electro-magnet 17, cam 18, and ratchet 18ª at one end of the shaft and the flat spring 19 at its opposite end. The spring 19 is always in contact with the shaft 15 and tends to push said shaft constantly in one direction.

The impulses sent over the line by the movements of the stylus at the transmitter do not influence the magnet 17 enough to overcome the tension of spring 20 except when the reversing-lever 8 of the transmitter is in contact with the spring 11, as at that moment the resistance 12 is cut out, and when cut out the impulses will sufficiently energize said magnet to pull down its armature 21 against the tension of spring 20, thus causing the ratchet 18ª to partially revolve cam 18 and permit the feed gear-shaft 15 to be moved longitudinally by the pressure of spring 19, whose tendency is always to push said feed-shaft in one direction. This movement of the shaft 15 reverses the feed by disconnecting feed-wheel 16 from one of the bevel-gears on said shaft and connecting it with the other, as more fully explained in my former application, Serial No. 542,621. The reverse movement of the transmitter-stylus causes the reversing-lever 8 to again contact with spring 11 and to cut out resistance 12, and the impulse thus sent over the line, influencing electromagnet 17, will attract for the instant its armature and cause the cam 18 to be turned sufficiently to reverse the movement of the feed-wheel against the stress of the spring 19.

When the reversing-lever 8 is in the position shown in Fig. 1 in contact with spring 11, the resistance 12 being then cut out, the circuit is from ground 22 to commutator-spring 23, to wire 24, to battery 4ª by way of wire 25, thence by wire 26 to contact-maker 5, to reversing-lever 8 and to spring 11, thence by wire 27 to the main line A, to magnet 17, to magnet 14 by way of wire 28 to ground 29. In this case the armature 21 will be attracted toward magnet 17 and the feed-wheel shaft will be shifted as above explained.

When the reversing-lever is in contact with either of the contacts 9 10, the armature of electromagnet 17 remains in the position in which it was left by the last impulse sent by the way of spring 11 when the resistance was cut out.

Having thus described my invention, what I claim as new, and desire to secure by Letters Patent, is—

1. In writing telegraphs, a resistance through which the writing impulses are sent, in combination with a friction contact adapted to send an impulse direct to line when the movement of the transmitting pen is reversed and the resistance is cut out, substantially as set forth.

2. In writing telegraphs, a circuit interrupter and a resistance through which the writing impulses are sent, in combination with the contact in series with the interrupter, through which an impulse is sent direct to line when the movement of the transmitting pen is reversed and the resistance cut out, substantially as set forth.

3. In writing telegraphs, a circuit interrupter constructed to send to line positive and negative pulsations, and a resistance through which these writing impulses are sent, in combination with a contact in series with the interrupter, through which an impulse is sent direct to line when the movement of the transmitting pen is reversed and the resistance cut out, substantially as set forth.

4. In writing telegraphs, the combination with a receiving feed-wheel and its shaft, of means for reversing the movement of said feed-wheel, the same consisting of a cam coacting with one end of said shaft and a spring coacting with its opposite end and tending to always push the shaft in one direction, and an electro magnet in the main line influenced from the transmitter and controlling the movement of said cam, substantially as set forth.

5. In writing telegraphs, the combination with a circuit interrupter at the transmitter adapted to send impulses of successively opposite polarity over a main line, and also provided with a reversing lever, of a resistance arranged between the transmitter and the main line, a friction contact in a branch of the main line with which said reversing lever coacts, means for reversing the movement of the feed wheel at the receiver and the electro magnet controlling said reversing means, substantially as set forth.

6. In writing telegraphs, the combination with the shaft of the feed reversing mechanism and means, including an electro magnet 17, for operating the same, of the batteries at the transmitter, a circuit interrupter having a contact maker, as 5, adapted to make contact with contact points 6, 7 in electrical connection with said batteries, and also provided with a lever, as 8, adapted to make contact with contact points 9, 10, in electrical connection with the main line, a resistance, as 12, between the main line and the transmitter and a spring, as 11, in a branch of the main line and adapted to be acted upon by lever 8 in its movements between contact points 9, 10, cutting out resistance 12 to influence electro magnet 17 at the receiver, substantially as set forth.

Signed at New York, in the county of New York and State of New York, this 2d day of February, A. D. 1895.

JAMES HART ROBERTSON.

Witnesses:
F. J. EMLEY,
J. R. SHUMAKER.